Jan. 20, 1953         E. T. McCARTHY         2,626,124
SEALED TOGGLE VALVE OPERATING MECHANISM
Filed June 17, 1949         3 Sheets—Sheet 1
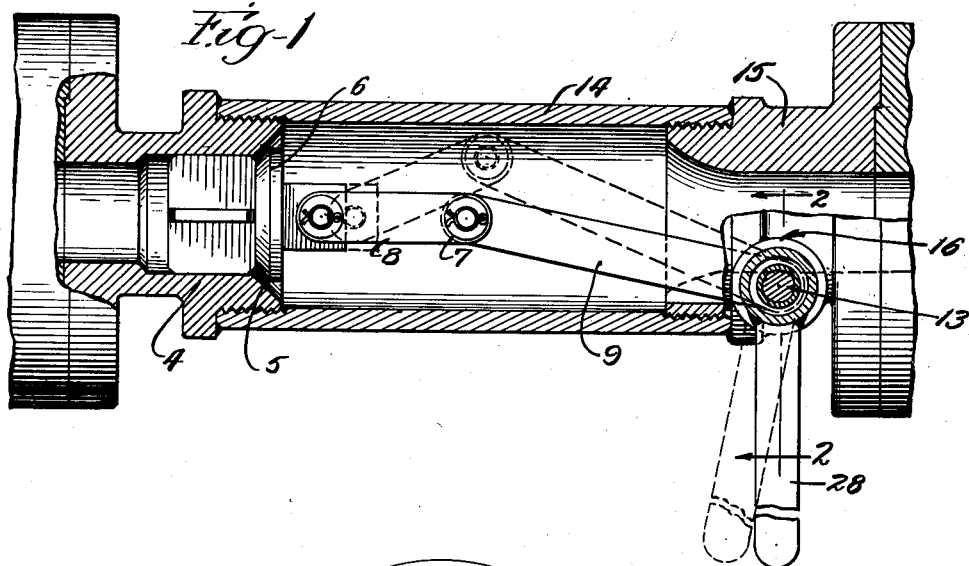
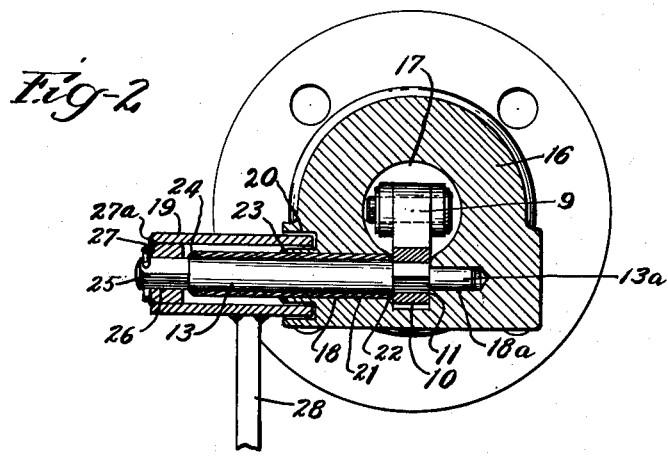
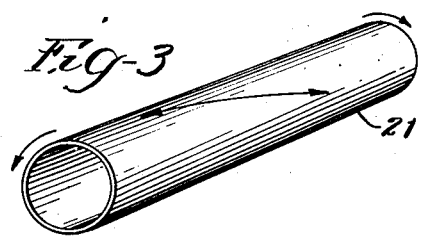
Inventor
Elmer T. McCarthy
By: Edward W. Weikert
Atty.

Jan. 20, 1953 E. T. McCARTHY 2,626,124
SEALED TOGGLE VALVE OPERATING MECHANISM
Filed June 17, 1949 3 Sheets-Sheet 2
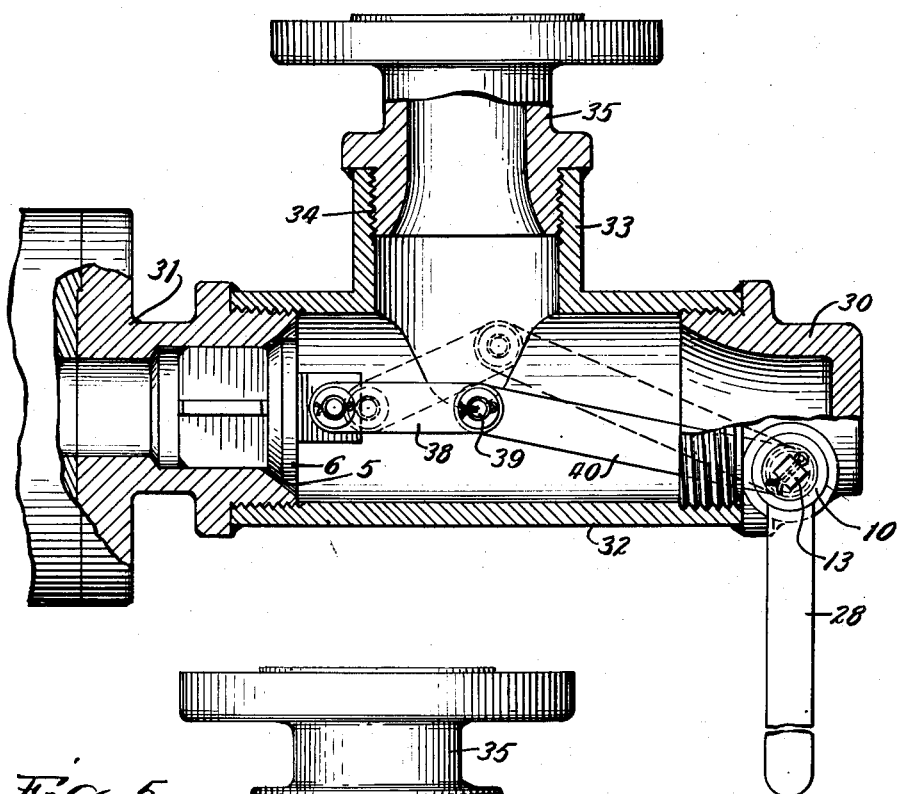
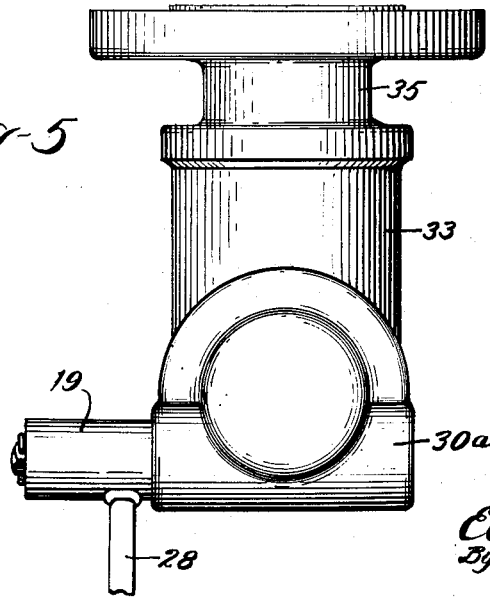
Inventor
Elmer T. McCarthy
By:- Edward W. Weinert
Atty.

Jan. 20, 1953  E. T. McCARTHY  2,626,124
SEALED TOGGLE VALVE OPERATING MECHANISM
Filed June 17, 1949  3 Sheets-Sheet 3
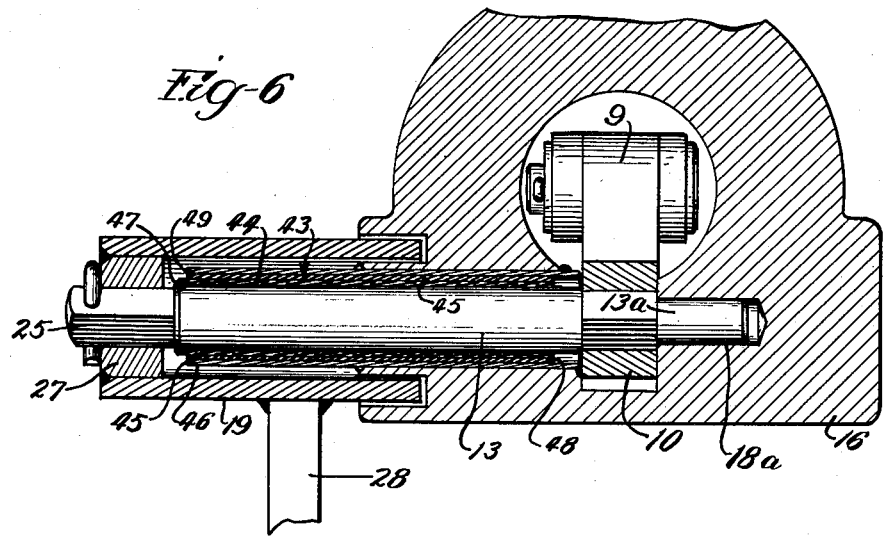
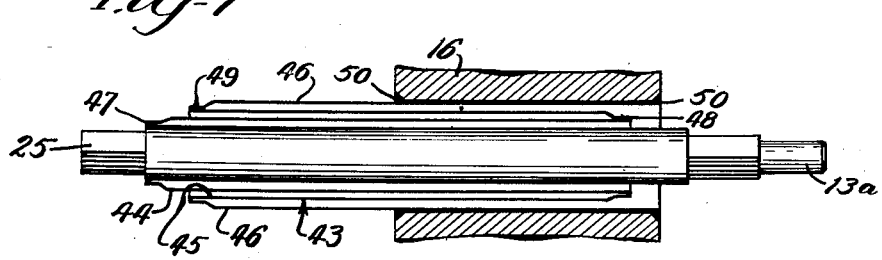
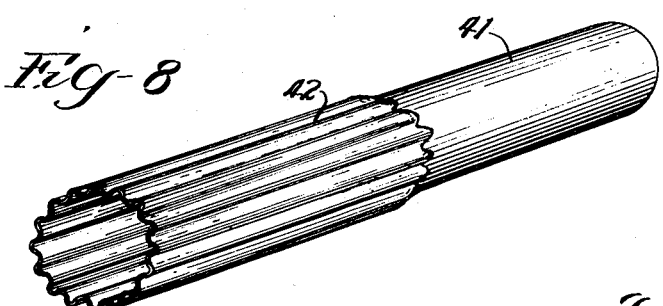
Inventor
Elmer T. McCarthy
By: Edward N. Weixert
Atty.

Patented Jan. 20, 1953

2,626,124

UNITED STATES PATENT OFFICE 2,626,124

SEALED TOGGLE VALVE OPERATING MECHANISM

Elmer T. McCarthy, Hamilton, Ohio, assignor to Klipfel Valves Inc., Division of Hamilton-Thomas Corp., a corporation of Illinois Application June 17, 1949, Serial No. 99,846

8 Claims. (Cl. 251—134)

This invention relates to operating mechanism for a toggle valve which seals the valve operating shaft thru a torque tube which is in tight sealing relation with the shaft and its bearing at spaced points and secured so that a portion of the tube can be twisted for operating the valve shaft without destroying the sealing relation of the parts.

Due to the limited twist than can be imparted to the tube, the operating shaft is connected by a toggle with the valve whereby a slight rotation of the shaft will be sufficient to completely open the valve thru a greater movement of the toggle. However, the invention is not limited to toggle valves since it can be adapted for other forms.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Fig. 1 is a longitudinal sectional view thru a valve housing containing a toggle valve and sealed operating mechanism involving this invention, Fig. 2 is a sectional view taken upon the line 2—2 of Fig. 1 looking in the direction of the arrows, Fig. 3 is a perspective view of the sealing tube, Fig. 4 is a longitudinal sectional view of a slightly modified form of the invention;

Fig. 5 is an end elevational view of the structure shown in Fig. 4,

Fig. 6 is an enlarged longitudinal sectional view similar to Fig. 2, but illustrating a modified form of torque tube;

Fig. 7 is a diagrammatic view illustrating the torque tubing shown in Fig. 6, and Fig. 8 is a perspective view of a further modified form of tubing.

Referring now to the drawing, especially to Figs. 1 to 3, there is shown a valve body or housing comprising a tail portion 4 and a head portion 15 connected by a sleeve 14 which is adapted to be inserted in any flow or pipe line for controlling the flow therethru. However, the invention can be applied to an angle or other form of valve as will later more fully appear. Interiorly of the tail portion of the valve housing, there is a bevelled valve seat 5 for a bevelled valve disk 6 which is connected to a toggle mechanism comprising a pair of links 8 which are connected at one end to the valve disc and at the other end to a toggle link 9 by the pivot 7. The free end of the toggle link 9 is provided with a hub 10 having a polygonal hole 11 surrounding a correspondingly shaped part on an operating shaft 13. However, any other form of connection between link 9 and shaft 13 may be resorted to that prevents relative rotation therebetween. In the present instance, the inner end of the shaft 13 is reduced as indicated at 13a.

The head portion 15 of the valve housing has a bearing 16 with a longitudinal flow passage 17 and a transverse bore 18 which is reduced at its inner end to receive the reduced portion of shaft 13 as indicated at 18a and which bore is located below the flow passage 17 with only a small opening communicating with said flow passage for connecting the toggle link 9 with the shaft. Due to this construction, the toggle 8—9 must flex in an upward direction to open the valve since there would not be sufficient movement in a downward direction to open the valve. With reference to Fig. 2, it will be noted that the shaft 13 extends a considerable distance beyond the bearing 16 and into a sleeve 19 which is journalled at its inner end for rotation in a groove 20 formed concentric with said shaft 13 in the side of the bearing 16.

The bore 18 of the bearing 16 contains a sealing torque tube 21 which extends from the hub 10 on link 9 to a suitable point beyond said bearing and surrounds the shaft 13 quite closely. The torque tube has a snug fit in the bore 18 of the bearing 16 leaving very little clearance therebetween, but this clearance that exists is sealed by welding, soldering, brazing or cementing circumferentially the inner end of the tube to the bearing 16 as indicated at 22. The torque tube may also be sealed in like manner at the point where it emerges from the bearing as indicated at 23. The outer end of the tube is welded or suitably secured in a circumferential manner to the shaft 13 as indicated at 24. In the present instance, the torque tube is designed to twist between the sealing points 23 and 24 and this length is designed to develop only a moderate torsional stress. In this form, the twist will occur beyond the bearing 16; but in some instances, the sealing ring at the point 23 may be omitted to secure a longer twist equal substantially to the length of the tube.

Adjacent the sealing ring 24, the shaft 13 has a polygonal end 25 fixed in a polygonal opening 26 in a plug 27 which is firmly secured in the outer end of the sleeve 19 by welding 27a or in any other suitable manner. Thus the shaft 13 is constrained to rotate with sleeve 19. To operate sleeve 19, a handle 28 is welded or secured thereto. Rotation of sleeve 19 which in effect acts as a crank will cause rotation of shaft 13 thru a twisting of the torque tube 21 between the circumferential welds or seals 24 and 23 which may be of any suitable distance, but which in the present instance is about ten inches. As designed a rotation of shaft 13 about twelve degrees will only be required to open the valve 5; but any other arrangement may be resorted to.

The shaft 13 will, of course, have a slight tolerance with respect to the inside diameter of the torque tube so that the shaft can easily rotate in the stationary part of the tube, but this tolerance can be varied as desired. As the torque tube is firmly sealed with respect to the bearing and also with respect to the shaft, it will be evident that the escape of fluid from the valve will be absolutely prevented.

As the torque tube provides only a limited rotation of shaft 13, about 12 degrees in the present instance, it is desirable to have a greater movement of the valve 5. This has been accomplished thru the use of a toggle connection between the valve and shaft; a small movement being sufficient to break the toggle.

In Figs. 4 and 5, there is illustrated the manner in which this invention may be applied to an angle valve. In this angle valve, there is a valve housing consisting of the head portion 30, the tail portion 31 and the connecting sleeve 32 which is provided with a laterally projecting sleeve or stub pipe 33 which is threaded as indicated at 34 for threaded relation with a coupling 35 which may be connected to any kind of pipe line. The tail portion of this housing is provided with a valve seat 5 for a disc valve 6 as in the first form. The valve disc is connected to toggle links 38 which are pivotally connected at their forward ends by pivot 39 to toggle link 40, which is connected at its forward end thru a hub 10 with operating shaft 13 as in the first form.

In the angle valve, the head 30 is not open, it is on the other hand, a closed cap which has a transversely extending bearing boss 30a in which the shaft 13 is journalled. Upon one end of the bearing boss 30a, there is journalled a sleeve 19 as in the first form and an operating handle 28 is secured to the sleeve. The handle 28 may be construed as a crank handle having a hub 19, the sleeve which is fast on shaft 13. Accordingly, the length of the sleeve may be varied as desired.

The torque tube may likewise be varied from the smooth form as shown in Fig. 3. It may be fluted as shown in Fig. 8 or a part thereof may be fluted, the part that is subjected to a twisting action. In Fig. 8, there is shown a torque tube having a smooth portion 41 that is designed to be placed in the bearing and a fluted portion 42 which may extend beyond the bearing. This fluted portion will provide additional torsional flexibility, lateral stiffness and increased radiating surface. While only the extended part of the tube is shown as fluted, in instances where the tube does not materially project beyond the bearing, the entire tube may be fluted.

The torque tube may also consist of a plurality of substantially concentric tubes connected in sealed relation as shown in Figs. 6 and 7. In Fig. 6, there is shown the bearing 16 in which the shaft 13 is journalled and connected to toggle link 9 and to sleeve 19 as in the first form. However in this form, the torque tube 43 consists of three concentric tubes, 44, 45 and 46 best shown in the diagrammatic view of Fig. 7. These tubes are arranged in nested relation with the inner or smallest tube 44 welded circumferentially to the shaft adjacent its outer end, as indicated at 47; the inner end of tube 44 is welded circumferentially to the corresponding end of intermediate tube 45 as indicated at 48. The intermediate tube 45 is slightly larger than the tube 44 and fits thereover. The outer end of the intermediate tube 45 is circumferentially welded to the outer end of the outer tube 46 as indicated at 49. The outer tube 46 is circumferentially welded to the bearing 16 as indicated at 50 and 51 in Fig. 7. Thus the torque tube 43 shown in this form of the invention consists of a plurality of nested tubes which are connected together as one structure. As the composite tube is both welded or secured to the shaft 13 and also to the bearing 16, a perfect seal for the shaft is provided.

Such a tube consisting of a plurality of nested tubes provides greater angular flexibility within a reasonably short axial length and may be preferable in some cases over a tube consisting of a single member.

In use, the fluid may pass in either direction thru the valve and it is highly desirable that the shaft be thoroughly sealed against leakage out of or into the valve body. As one end of the torque tube is welded to the valve body and the other end to the shaft, it will be evident that no leakage can occur.

It will be understood that with the structure as set forth, the shaft 13 does not have any bearing in the torque tube, but only in the reduced bore 13a thru the reduced portion 13a on the shaft.

The valves may be made from metal or any suitable material such as plastics or ceramics or any suitable composition. In the present instance, metal is illustrated which is conducive to sound welding for producing effective sealing joints.

I am aware that many changes may be made and various details of construction may be modified without departing from the principles of this invention so I do not propose limiting the patent granted otherwise than necessitated by the appended claims.

I claim:

1. In valve operating and sealing mechanism, a housing having an interior bevelled valve for controlling the flow therethrough, a bearing associated with said housing at right angles to the longitudinal axis of said housing, a shaft mounted in said bearing and projecting beyond said housing, a toggle connection between said shaft and valve, means for sealing said shaft in said bearing comprising a metal torque tube surrounding said shaft within said bearing, means for sealing one end of said tube to said bearing and the other end to said shaft and means secured to said shaft exteriorly of said housing for rotating said shaft thru a twisting of said tube between said sealed points.

2. In a valve operating and sealing mechanism, a valve housing, a bevelled valve in said housing for controlling the flow therethru, said housing having a bearing at right angles to the longitudinal axis of said housing, a shaft mounted in said bearing and extending outwardly beyond said bearing, a toggle connecting said valve and shaft within said housing, a metal torque tube surrounding said shaft and having a circumferential portion welded to said bearing and a circumferential portion welded to the extended portion of said shaft outside of said housing, a sleeve hub surrounding the extended portion of said shaft and having a fixed relation with said shaft and a journalled relation with said bearing and a handle on said hub for rotating said shaft thru a twisting movement of said tube.

3. In a valve operating and sealing mechanism, a valve housing, a bevelled valve in said housing for controlling the flow therethru, said housing having a bearing extending at right angles to the longitudinal axis of said housing, a transverse shaft in said bearing and having an extension beyond said housing, a toggle connecting said valve and shaft, a metal torque tube surrounding said shaft and having a circumferential portion welded to said bearing and a circumferential portion welded to the outer end of said shaft, a sleeve surrounding said shaft and having its inner end journalled upon said bearing concentric with said shaft and its outer end fixed to said shaft and a handle upon said sleeve for rotating said shaft thru a twisting movement of said torque tube.

4. In a liquid flow housing having a flow passage with a bevelled valve for controlling the flow thru said passage, sealed operating mechanism for said valve comprising a shaft journalled transversely in said housing beneath said passage and having an extending portion beyond said housing, a toggle connection between said shaft and valve, a metal torsion tube surrounding said shaft from a point adjacent said flow passage to a point adjacent the outer end of said shaft, said tube being circumferentially welded to said housing adjacent said flow passage and being welded to said shaft at a point spaced from its outer end, a sleeve surrounding the extending portion of said shaft, said sleeve being fixed to the outer end portion of said shaft and being mounted for rotation with respect to said housing and an operating handle on said sleeve.

5. In a liquid flow housing having a flow passage with a bevelled valve for controlling the flow thru said passage, sealed mechanism for operating said valve comprising a shaft, said housing having a transverse bearing bore beneath said passage with an opening to said flow passage, said shaft having its inner portion journalled in said bore with its outer portion extending beyond said housing, a toggle attached to said shaft in said opening and being connected to said valve, a metal torsion tube surrounding said shaft from a point adjacent said flow passage to a point adjacent the outer end of said shaft, the inner end of said tube being welded to said housing at said flow passage and the outer end thereof being welded to said shaft and means for operating said shaft.

6. In a liquid flow housing having a flow passage with a bevelled valve for controlling the flow thru said passage, said housing having a transverse bearing bore extending beneath said flow passage with a communicating opening to said flow passage, a shaft extending into said bearing bore and having a connection with said valve thu said communicating opening, a metal torsion tube surrounding said shaft and having its inner end circumferentially welded to said housing adjacent said flow passage and its outer end circumferentially welded to said shaft beyond said housing, said shaft having an extension beyond said housing, said housing having a bearing groove concentric with said shaft, a sleeve surrounding the extension of said shaft with its inner end journalled in said groove and its outer end fixed to said shaft and means on said sleeve for rotating said sleeve and shaft a limited extent.

7. In a liquid longitudinal flow housing having a flow passage with a bevelled valve for controlling the flow thru said passage, a shaft extending into said housing at right angles to said flow passage and beneath the same and having a section exposed to said passage, toggle means connecting said exposed section of said shaft and said valve, a metal torsion tube surrounding said shaft and having its inner end circumferentially welded to said housing adjacent said flow passage and having its outer end circumferentially welded to said shaft beyond said housing, and means for operating said shaft in a clockwise direction for opening said valve.

8. In a liquid flow housing having a flow passage therethru with a valve for controlling the flow therethrough, said housing having a bearing bore extending at right angles to the flow passage and an opening communicating with said flow passage, a shaft journalled in said bearing bore, a toggle connection connecting said shaft and valve and extending thru said opening in said bore, said shaft extending outwardly in a lateral direction from said housing, a metal torque tube surrounding said shaft from a point adjacent said opening to a point spaced from the outer end thereof, said tube being welded to said housing at its inner end and to said shaft at its outer end, said housing having a circular raceway concentric with said shaft, a hub sleeve surrounding the extended portion of said shaft and fixedly secured to the outer end thereof and rotatably mounted in said race way and means for rotating said hub sleeve.

ELMER T. McCARTHY.

REFERENCES CITED

The following references are of record in the file of this patent:

UNITED STATES PATENTS

| Number | Name | Date |
|---|---|---|
| 611,386 | Maurer | Sept. 27, 1898 |
| 785,323 | Nadrowski | Mar. 21, 1905 |
| 1,285,798 | Roney | Nov. 26, 1918 |
| 1,779,967 | Eule | Oct. 28, 1930 |
| 1,827,560 | Binckley | Oct. 13, 1931 |
| 1,902,336 | Murray | Mar. 21, 1933 |
| 2,248,322 | Annin | July 8, 1941 |
| 2,263,771 | Griffey | Nov. 25, 1941 |
| 2,315,031 | Wiegand | Mar. 30, 1943 |

FOREIGN PATENTS

| Number | Country | Date |
|---|---|---|
| 567,090 | Great Britain | of 1945 |